(No Model.)
J. BRÖNNER.
METHOD OF PURIFYING IMPURE ANTHRACHINONE AND ALIZARINE.
No. 275,128. Patented Apr. 3, 1883.
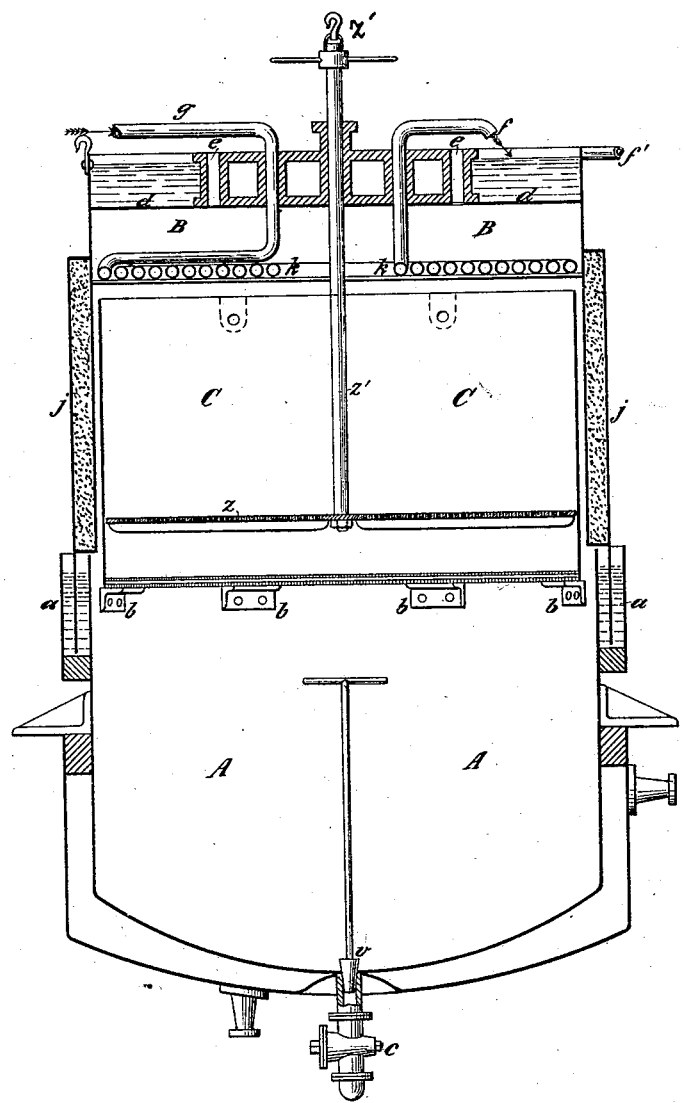

UNITED STATES PATENT OFFICE.

JULIUS BRÖNNER, OF FRANKFORT-ON-THE-MAIN, GERMANY.

METHOD OF PURIFYING IMPURE ANTHRACHINONE AND ALIZARINE.

SPECIFICATION forming part of Letters Patent No. 275,128, dated April 3, 1883.

Application filed May 13, 1882. (No model.)

*To all whom it may concern:*

Be it known that I, JULIUS BRÖNNER, a subject of the Emperor of Germany, and resident at Frankfort-on-the-Main, Germany, have invented new and useful Improvements in the Process of and Apparatus for the Purification of Anthrachinone and Alizarine and of other Substances, of which the following is a specification.

This invention consists in a process for the purification of impure anthrachinone and impure alizarine by solution of their soluble constituents in hot volatile solvents and crystallization of the substance to be purified from the hot and filtered solution in such a manner that there is required only a very limited proportion—say about one-fifth—of that quantity of solvent which must be applied according to the method hitherto known and practiced in order to attain the same end; and this purification may be effected by means of an apparatus in which the substance to be purified is crystallized, and which at the same time permits the insoluble impurities to be separated by filtration from the hot solution without any loss by evaporation, by means of which process of combined simultaneous solution, filtration, and crystallization the purification of the said substances by crystallization is effected with only a very limited proportion of the quantity of solvent hitherto requisite, and the purification may be effected profitably on a large scale—a result hitherto often attempted, but never with success.

Alizarine, as is well known, is prepared from anthrachinone and anthrachinone from anthracene. Crude anthracene, however, is a body of very varying properties, and is accompanied, according to the kind of coal from which it has been obtained, by impurities which are more or less injurious for the manufacture of alizarine. There are indeed many anthracenes whose injurious impurities can, on a manufacturing scale, be rendered innoxious only with great difficulty and expense, or not at all. This is the case principally with the higher homologues of anthracene, as methyl-anthracene and the other alkyl compounds of anthracene. These, in the oxidation of the crude anthracene, are converted into homologous anthrachinones—such as methyl-anthrachinone, and so forth—which oppose to the commonly-used methods of purifying crude anthrachinone—as, for instance, to precipitation by concentrated sulphuric acid or by sublimation—the same resistance as anthrachinone itself, and consequently cannot be removed by these methods of purification. An impure anthrachinone is, moreover, in the highest degree fatal to the preparation of alizarine, not only as regards the quality of the alizarine, but also as regards the yield or outcome, on which account it has been a first principle in many alizarine factories to employ anthracenes of choice quality alone, although these stand materially higher in price; and since anthracenes of choice quality, apart from their higher prices, are also to be had only in limited quantity, it has always been an aim and effort in the alizarine industry to discover a process which would render it possible to prepare on an industrial scale from anthracene of any quality anthrachinone of sufficient, if not absolute, chemical purity. The one property in those injurious impurities above mentioned wherein they differ from anthrachinone, and which can be taken advantage of for their removal, is their greater solubility in volatile organic solvent media belonging to the fatty and the aromatic series, such as acetic acid, spirit, ether, petroleum, petroleum-naphtha, benzol, toluol, xylol, phenol, and the like, or mixtures of these. Now, hitherto, in order to dissolve an impure anthrachinone in a quantity of any one of these solvents, such a quantity of the solvent was applied as was sufficient to bring the whole quantity of anthrachinone with which one worked into solution at once, and to keep it all in solution at boiling-point at once, and then from this solution of the entire mass the anthrachinone was allowed to crystallize out on the cooling of the solution. In the crystallizing of the anthracinone out of one of these solvents the impurities (especially the homologues of anthrachinone) are, as is well known, dissolved in the mother-liquor, while the anthrachinone, soluble with difficulty in the said solvents, crystallizes from them in almost chemically-pure condition. This process however, could not, from reasons of technical economy, be applied on a manufacturing scale, for anthrachinone is soluble in the said solvents with so much difficulty that in the process described quite enormous quantities of solvent are required to be applied in order to attain the required result. The solvent which works most favorably is so-called "solvent naphtha," a rectified coal-tar oil which boils at from 120° to 160° centigrade. Of this solvent it needed about sixteen parts to bring one part of anthrachinone into solution at boiling-point. There were required also, for carrying out the process mentioned, utensils disproportionately large and numerous, and, besides this, the handling of such considerable quantities of so volatile a solvent, while heated, was inseparable from losses of solvent which were out of all proportion to the results to be attained. In point of fact, then, the process mentioned was only applied for laboratory purposes, while all attempts to apply it also on a large scale were frustrated by the causes which I have assigned. The process which forms the subject of this specification has solved the problem of effecting the purification of anthrachinone by means of solvent naphtha or a similar solvent in a much cheaper and much more convenient fashion, and thereby making such purification practicable on a large scale. This is accomplished by employing of the solvent naphtha only so much as is necessary to hold constantly in solution the soluble impurities contained in any definite or given quantity of anthrachinone. Since, however, in the process of purification, the anthrachinone itself must also be dissolved in order that it may subsequently separate itself by crystallization from the impurities which remain behind in solution, the quantity of solvent mentioned would not, without further arrangements, be sufficient to carry out the process of purification. To effect this we must proceed in such a way as to allow the solvent to dissolve, not all at once, but gradually, and bit by bit, the soluble impurities, and along with them the anthrachinone, and, further, at the same time, by means of continuous evaporation or volatilization of the solvent, to cause the anthrachinone for the time being in solution to crystallize, to bring the evaporated solvent, after it is again condensed anew, into contact with the mass to be dissolved, and to continue the operation till anything that is soluble has been dissolved. The anthrachinone which is to be purified is in the course of this operation kept separated by means of a filter from the solution, so that after solution is finished and completed the insoluble constituents or parts which were contained in the anthrachinone are separated from the solution itself and can be easily removed. Since the finally-resulting solution contains only so much naphtha is necessary to hold the soluble impurities in solution, the more difficultly soluble anthrachinone consequently cannot any longer keep its place in the solution, and it is thus compelled, during the continuous process of evaporation which is going on, to crystallize out, and the crystals can, after the process is ended and after the liquid has been allowed to flow off, be taken out of the vessel with facility. By this process the crystallization of impure anthrachinone which has been treated with sulphuric acid may be effected with only from an eighth to a fifth part of the quantity of solvent which was necessary in the process heretofore used. The working losses of solvent are thereby reduced to such a minimum that now the application of the crystallizing process is practically possible on a large scale.

For the carrying out of the process above described, I may make use of an apparatus which is constructed somewhat like the well-known extraction apparatus, but in which I have made certain changes which are very important, and, indeed, essential to the success of my process.

In the accompanying drawing such an apparatus is shown in vertical section. This apparatus consists of three parts—a boiler, A, a filter, C, and a hood or cover, B. These three parts can be easily taken asunder from each other, and can also be readily put together again. At the bottom of the boiler A there is an opening fitted with an outflow-pipe, which can be closed by the stop-cock $c$. In order that this opening should not get choked up during the crystallization, it is provided with a conical plug or stopper, V, which is furnished with a handle projecting above the liquid. Near the upper edge or rim of the boiler A there are fastened certain angle-iron brackets $b$, on which the filter C can be set. The filter consists of a holder or receiver destined for the reception of the anthrachinone to be purified, the bottom or floor of the receiver being formed of a perforated disk covered with filter-cloth. The receiver C is so much smaller externally than the interior of the boiler A that an interval of space is left between them, which allows the vapors forming in A to rise upward above the filter C. Outside, at the upper rim of the boiler A, there is a channel, $a$, in which the hood or cover B is set. This channel is filled with a suitable fluid in order to form a hydraulic seal or water or other liquid lute between the boiler and the hood. Inside of the upper part of the hood B there is a coil of pipe, $k$, in which refrigerating-water circulates. The water flows in at $g$ and out again at $f$. The roof of the hood B is provided on the outside with an elevated rim, which forms the basin $d$ for the reception of the refrigerating-water flowing out of $f$. The water flows away out of this basin at $f'$. In the center of the head or crown of the hood there is an opening upward into a gland, through which the handle $z'$ of a distributer, $z$, passes, which distributer, by moving it from time to time, spreads the mass lying on the filter, and prevents the condensed solvent dropping down from the cooling-coil $k$ from forming in the mass to be dissolved channels through which it might run directly back into the boiler without doing any work.

The distributer $z$ consists of a perforated plate, to the under surface of which is fastened a downward-projecting obliquely-set strong wire or scraper. This distributer serves at the same time as a feeler to give indication of the height, from time to time, of the contents of the receiver C. The side walls of the hood are surrounded with a jacket, which incloses a bad conductor of heat to prevent the condensation of the ascending vapors of the solvent on the side walls of the hood. The safety-tubes *e e* in the roof of the hood allow exit for the vapors in case of defective cooling.

If I wish to heat the boiler A in a way which does not admit of jacketing or the use of the stop-cock *c*, I dispense with both and empty the liquid contents of the boiler A in some other manner.

The process is now as follows: After I have, by an analysis of a small portion, ascertained the proportion of soluble impurities contained in the anthrachinone to be purified, (such analysis afterward requiring to be repeated only in the case of other sorts of anthrachinone than the sort which I am in the habit of working with,) I introduce into the boiler A (the hood B and receiver C having been removed) solvent naphtha in quantity according to the quantity of soluble impurities contained in the anthrachinone to be purified, adjusting such quantity of solvent by means of additions, and keeping account of the need that there should always be present an excess of solvent in order to be sure of keeping the soluble impurities in solution during the evaporation, for one part of the liquid is, during the evaporation, constantly under way, another part is soaked up by the contents of the holder C, and so without that addition there might be a shortcoming or deficiency of solvent which would give rise to a hurtful crystallizing of the impurities. In the case of anthrachinone of average or ordinary impurity, whose existence and proportions are known, from 2.5 to 3 kilograms of solvents are enough for every kilogram of the anthrachinone to be purified. If extraordinary or unusual kinds of anthrachinone are to be purified, in such case, as already observed, a rough preliminary analysis will readily indicate to what extent it will be necessary to increase the quantity of solvent so as to keep the whole soluble impurities in solution. Thereupon the filter-receiver C, containing the anthrachinone to be purified, is set upon the brackets *b* of the boiler A, and the quantity of anthrachinone to be purified is filled in, after it has been well stirred up beforehand, with one to two per cent. of dissolved calcined soda, in order to improve the filtration, and after having been then thoroughly dried. Lastly, the hood B is let down into the channel or water-seal *a*, and the solvent contained in the boiler is brought to the boiling-point. The vapors evolved ascend through the interval of space between the walls of C and A and B up into the higher parts of the apparatus and get up to the cooling-surfaces *k* and *d*. Thence they fall, as a condensed hot liquid, onto the anthrachinone lying in C, dissolve it as well as the soluble impurities, and get back again as a filtered saturated solution into A. In consequence of the evaporation of solvent, which is in this way constantly taking place, the anthrachinone in the boiler finds too little solvent for it to be kept in solution, wherefore it crystallizes out in the boiler, while the soluble impurities, because they are much more readily soluble than anthrachinone and therefore require much less solvent, remain dissolved. It thus comes about, through the process of evaporation which is continuously maintained, that the anthrachinone is quickly deposited in the form of crystals, while the much more soluble impurities still find enough of solvent to remain dissolved. The molecule of solvent, on the other hand, which has deposited its anthrachinone, is again evaporated, and does its work over and over again a great many times. It carries down repeated charges of anthrachinone, each time depositing its charge and returning for a new charge until the whole of anthrachinone has at last been carried down. The non soluble impurities remain behind on the filter. When all the anthrachinone on the filter has been dissolved, which may be known by the sinking down of the movable distributer *z*, which is turned round from time to time, the hood B is drawn up out of the hydraulic seat, and the receiver C, with the filter and the residues of filtration, is lifted down from its position on the rim of the boiler and put aside from it. This can be done with the greatest ease without the filtered substances in the lower part of the boiler being possibly contaminated in the process by the smearing about or spilling of the filter residues into them, in which case the whole operation would be frustrated. This facility of handling all the parts of the apparatus is due to the fact that the hood B sits on the upper rim of the boiler and the filter-receiver C sits on the brackets *b b* inside; hence the receiver C, when the hood is lifted off, stands entirely free and accessible, and so does the handle of the stopper or plug *v*, which could not otherwise be drawn out. The stopper or plug *v* is then removed and replaced by a perforated hollow filtering-plow, and the liquid in the under part, A, of the apparatus is allowed to flow down through the outlet-cock C into a reservoir, and that at a temperature at which the impurities shall remain in solution, (about 80° centigrade.) The crystals obtained are then fished out, which, owing to the above-mentioned facilities of putting together and taking asunder the apparatus, can even with the largest apparatus be done readily. The crystals that are taken out are freed by evaporation from the adherent solvent and dried, and are then nearly chemically pure anthrachinone. The liquor which has been allowed to flow down into the reservoir is, after cooling, in the course of which crystals of less purity separate from it, used in the apparatus for a new operation. The crystals separated out in the reservoir are collected until they are sufficient to make a complete charge, and are again treated in the apparatus with fresh solvent in manner above mentioned. The crystals which separate out in the apparatus in this second operation are also almost chemically pure anthrachinone.

The liquid allowed to flow down into the reservoir can, after cooling, be used a second time as a solvent. The crystals which have separated out in the reservoir after the second operation, whereof the quantity is of course much smaller than in the working up of the original anthrachinone, are collected and again treated in the apparatus as before. The crystals which separate out in the apparatus in the course of the third operation are, as a rule, also nearly chemically pure anthrachinone. If not, they are added to another charge, and then yield anthrachinone almost chemically pure. The twice-used solvent is, along with the mass of crystals which separate out in the reservoir in the course of the third charge, subjected to distillation, in order to recover again the pure solvent. The residues of distillation are run off, filtered after cooling, and put under hydraulic pressure. The filtrate is distilled, and from the filter-cakes small quantities of anthrachinone can still be obtained by treatment in the apparatus. The insoluble residues remaining behind on the filter in the apparatus are put under hydraulic pressure and sublimed with steam. The sublimate treated in the apparatus yields also nearly chemically pure anthrachinone.

If it is preferred, the crude anthrachinone may also be subjected, before treatment with sulphuric acid, to the continuous crystallization process in the apparatus described, and then treated with sulphuric acid, whereby there is an essential saving in the latter; or, moreover, it may, without the sulphuric-acid treatment, be subjected to a repeated continuous crystallization, in which case the non-oxidized anthracene can be recovered from the mother-liquors. I do not, however, prefer this manner of treatment to that first described, because the latter secures greater certainty.

A further application of the invention relates to the purification of alizarines that have miscarried and are impure, including purpurine and all the dyestuffs comprehended under the general commercial designation of "alizarine." If these coloring-matters, after drying, are subjected in a corresponding way to a crystallization from solvent naphtha or other suitable solvent in the apparatus above described, these coloring-matters are obtained in extraordinary purity and without any injurious impurities.

The advantages of the new process, in comparison with that hitherto known, are manifest. While there was necessary heretofore, for the purification of a given quantity of anthrachinone, sixteen times the quantity of solvent, from two and a half to three times the quantity is all that is required under the new process. The apparatus above described, which serves for the application of the process, is very simple, and also easy to be worked and free from danger.

The apparatus shown and described herein will form the subject-matter of a separate application for Letters Patent.

What I claim as my invention, and desire to secure by Letters Patent, is—

The within-described process of effecting the purification of anthrachinone and alizarine, consisting in first vaporizing the solvent, then condensing the vapor, and percolating the heated condensed liquid through the mass and back to the vaporizing apparatus, the quantity of solvent employed being such, in proportion to the mass to be treated, as to retain the soluble impurities in solution, as well as the pure anthrachinone, whereby the repeated evaporations, condensations, and percolations through the mass dissolve out the soluble impurities and the pure anthrachinone, the insoluble impurities being retained by filtration, while the soluble impurities are separated from the pure anthrachinone, after filtration, by the crystallization out of the latter, while the former still remain in solution, the crystals, when removed from the apparatus, being freed from adhering liquor by evaporation, forming pure anthrachinone, the object of this process, substantially as described.

In testimony whereof I have signed my name to this specification in the presence of two subscribing witnesses.

JULIUS BRÖNNER.

Witnesses:
FRANZ HAPLACHER,
FRIEDRICH JAEGER.